US009442511B2

(12) United States Patent
Ish-Am

(10) Patent No.: US 9,442,511 B2
(45) Date of Patent: Sep. 13, 2016

(54) METHOD AND A DEVICE FOR MAINTAINING A SYNCHRONIZED LOCAL TIMER USING A PERIODIC SIGNAL

(71) Applicant: ECI Telecom Ltd., Petach Tikva (IL)

(72) Inventor: Oren Ish-Am, Ramal Gan (IL)

(73) Assignee: ECI TELECOM LTD., Petach Tikva (IL)

( * ) Notice: Subject to any disclaimer, the term of this patent is extended or adjusted under 35 U.S.C. 154(b) by 44 days.

(21) Appl. No.: 14/514,435

(22) Filed: Oct. 15, 2014

(65) Prior Publication Data

US 2015/0106647 A1    Apr. 16, 2015

Related U.S. Application Data

(60) Provisional application No. 61/890,885, filed on Oct. 15, 2013.

(51) Int. Cl.
| G06F 1/12 | (2006.01) |
| G06F 13/42 | (2006.01) |
| G06F 1/14 | (2006.01) |
| H04J 3/06 | (2006.01) |

(52) U.S. Cl.
CPC ............. *G06F 1/14* (2013.01); *H04J 3/0697* (2013.01)

(58) Field of Classification Search
CPC ....................................................... G06F 1/10
USPC ....................................................... 713/401
See application file for complete search history.

(56) References Cited

U.S. PATENT DOCUMENTS

| 5,918,040 | A * | 6/1999 | Jarvis ............................ 713/375 |
| 6,157,957 | A * | 12/2000 | Berthaud ...................... 709/248 |
| 6,236,277 | B1 * | 5/2001 | Esker ............................. 331/14 |
| 6,633,989 | B1 * | 10/2003 | Hollins ......................... 713/400 |
| 7,251,199 | B2 * | 7/2007 | Eidson .......................... 368/46 |
| 7,339,922 | B2 * | 3/2008 | Ho ................................. 370/350 |
| 7,668,243 | B2 * | 2/2010 | Ho et al. .................. 375/240.28 |
| 8,181,057 | B2 * | 5/2012 | Nichols et al. ............... 713/401 |
| 8,625,641 | B2 * | 1/2014 | Liang ............................ 370/503 |
| 8,705,509 | B2 * | 4/2014 | Kuwabara ..................... 370/350 |
| 8,953,644 | B2 * | 2/2015 | Chandra et al. ............. 370/503 |
| 9,003,220 | B2 * | 4/2015 | Chandhoke et al. ......... 713/401 |
| 2007/0025266 | A1 * | 2/2007 | Riedel et al. ................. 370/252 |
| 2013/0215910 | A1 * | 8/2013 | Inomata ....................... 370/503 |
| 2014/0233590 | A1 * | 8/2014 | Someya et al. .............. 370/503 |

* cited by examiner

*Primary Examiner* — Suresh Suryawanshi
(74) *Attorney, Agent, or Firm* — Browdy and Neimark, PLLC

(57) ABSTRACT

A method is provided for maintaining a synchronized local timer by using a periodic signal which comprises: providing a value of a clock cycle, and values for a first and second timer-parameters, wherein the first timer-parameter is less than the clock cycle value and the second timer-parameter is higher therefrom; providing values for a first ("a") and second ("b") arbitration parameters associated with the first and second timer-parameters respectively; upon receiving a periodic signal, adding to the local timer, at least once the first and/or the second timer-parameter, so that on average over one second, the first timer-parameter is added "a" times and the second timer-parameter is added "b" times, thereby ensuring that a value of the local timer essentially overlaps the period frequency of the periodic signal; upon receiving a subsequent periodic signal, setting the value of the local timer to a propagation delay of the periodic signal.

18 Claims, 3 Drawing Sheets

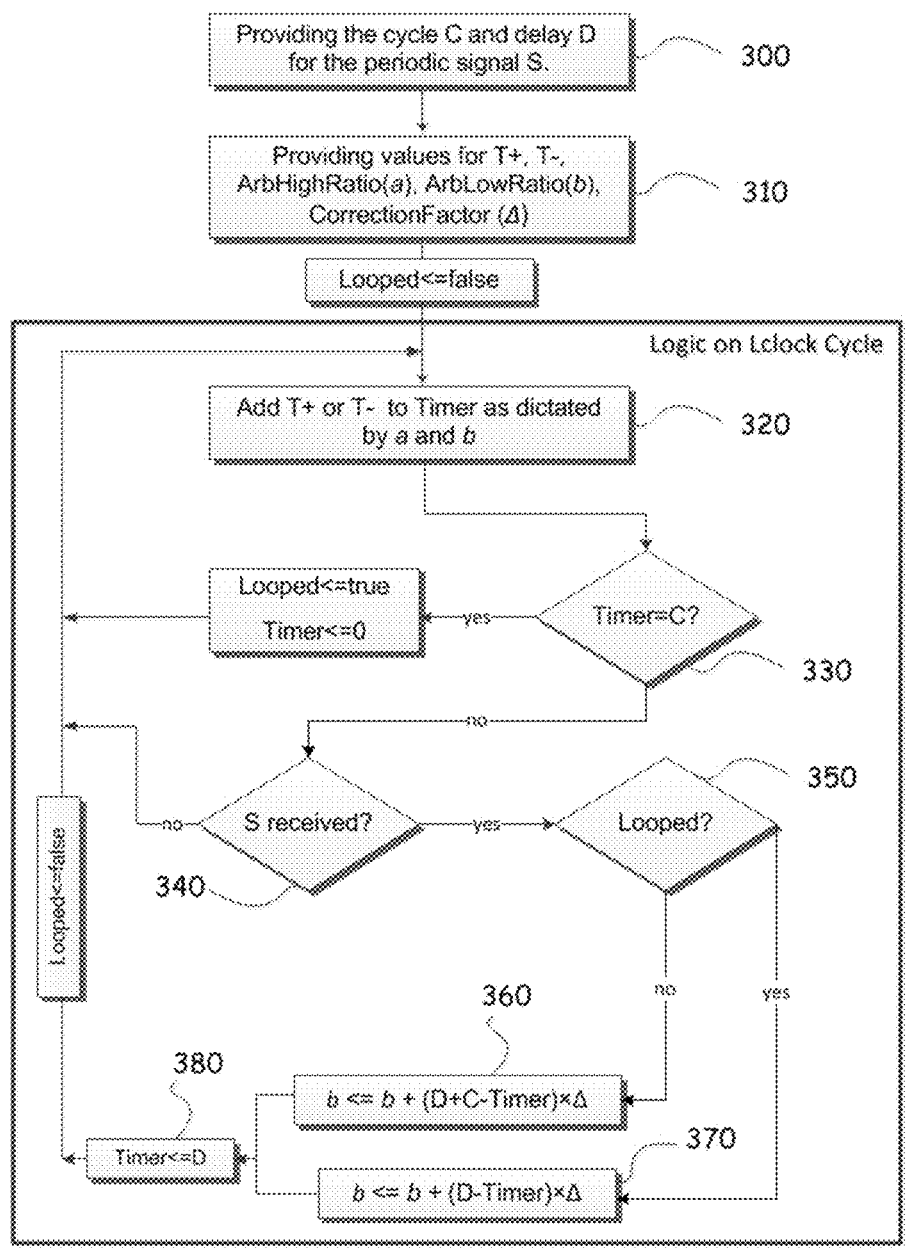

METHOD AND A DEVICE FOR MAINTAINING A SYNCHRONIZED LOCAL TIMER USING A PERIODIC SIGNAL

TECHNICAL FIELD

Embodiments of the present disclosure generally relate to the field of data communications in digital systems. More particularly, embodiments of the present disclosure relate to devices and methods for maintaining a synchronized timer in a network element of a distributed network.

BACKGROUND

Clock synchronization is necessary for many applications in communication networks. Clock synchronization protocols use a master clocks and timestamp information transmitted over packets to synchronize other nodes in the network. Specifically, 1588 Precision Time Protocol (PTP) uses hierarchical master-slave architecture and utilizes the internet to pass its packets to and from the slave nodes. PTP packets carry master timestamps to slave nodes where complex phase lock loops (PLLs) and filters recover the master clock and the 64 b timer associated with it.

PTP uses Sync, Delay_Req and Delay_Resp messages to advertise the master clock time and measure the (assumed) bi-directional delay. This delay is required to keep the nodes synchronized with the Master clock 64b timer and not only syntonized (i.e. being of the same tone, or in other words, being of the same frequency but not necessarily of the same phase) with its clock frequency.

Some applications such as cellular communications require sub microsecond synchronization of their respective clocks. PTP and other network synchronization protocols are especially vulnerable to variable/asymmetric delays and node congestion, as these are not taken into account in the delay calculations. To this end, 1588 v2 has an option for each PTP packet to measure its residence time, i.e. the time it takes each PTP packet to traverse a network element. These times are sometimes ignored during the delay calculation, effectively removing variable delays from the network. These element-wise residence time measurements require all packet passing elements within a node, to maintain a synchronized timer for packet time-stamping.

In a usual telecommunication node, a distributed architecture consisting of many elements is common, where each element plays a part in the switching/routing and management process. Though processing of the PTP packets and recreation of the master clock can be done on a regular processor with the required SW stack, precise reproduction of the PTP clock requires specialized and expensive HW. Due to this, it is common in distributed systems to have all the PTP packets routed to one element which reproduces the clock and distributes it to all the other elements in the distributed system. Since all the packet-passing elements need to maintain a timer synchronized with the PTP element, different information may be distributed to all the packet processing nodes, for example, a PTP clock (recovered from the PTP packets by the PTP HW), a once-per-second pulse (called 1PPS), and sometimes Time Of Day (TOD).

Distributing the master clock to all elements in a distributed system is costly in backplane and chip resources; its only aim to maintain the per-element 32 b/64 b ns timer needed to record ingress and egress packet times. Routing clocks around to maintain timers in all packet processing nodes is a burden on often loaded clock routing resources and may not be possible in legacy boards fitted with new FPGA logic and aiming to comply with strict PTP specifications.

SUMMARY

In view of the deficiency of conventional methods it is an object of the present disclosure to provide a 32/64 b timer compatible with IEEE 1588 or 1731 standards, and method which can use a periodic signal (1PPS in the 1588 case) to recover the master timer with great accuracy. The proposed apparatus and method overcome the need to distribute the master clock to all elements. One embodiment of the disclosure, provides a method for maintaining a local 32/64 b timer (hereinafter referred to as "LTimer") synchronized in a network element running under a local clock (hereafter referred to as "Lclock") which closely follows a mater timer (hereinafter referred to as "MTimer") running on the master clock (hereafter referred to as "Mclock"). The synchronization may be achieved by using a periodic signal having a known period frequency (one second with 1PPS in the 1588 case), and without using information derived from the Mclock.

In accordance with another embodiment, the recovery of MTimer can be done without the use of a PLL and requires only about 180 b of memory and one 18×20 dedicated multiplier if implemented frugally. The apparatus may converge exponentially to the value of the MTimer, requiring only a few cycles of the periodic signal in order to converge. The algorithm implemented by the apparatus may include several free parameters which allow it to operate under any Lclock frequency, with any periodic signal. Calculation of these parameters can be determined by knowing the Lclock period (hereafter referred to as "T") and performing physical measurements of the periodic signal's propagation delay, as described in detail below.

Some embodiments of the disclosure include a network element that maintains a local timer (LTimer) by adjusting an arbitration scheme which has a negative feedback from the value of the local timer at the receipt of a periodic signal and the expected period of the periodic signal. The local timer (LTimer) may be used for Residence Time measurements, or for time-stamping packets to measure one-way network delay.

According to a first embodiment of the disclosure, a method is provided for maintaining a synchronized local timer in a network element by using a periodic signal having a known period frequency, the method comprising:

providing a value of a clock cycle associated with the network element, and values for a first timer-parameter ("T−") and a second timer-parameter ("T+"), wherein the value of the first timer-parameter T− is lower than the value of the clock cycle and the value of the second timer-parameter T+ is higher than the value of the clock cycle;

providing values for a first arbitration parameter ("a") associated with the first timer-parameter and a second arbitration parameter ("b") associated with the second timer-parameter;

in response to receiving a periodic signal, adding every clock cycle to the local timer of the network element at least once first timer-parameter (T−) and/or at least once second timer-parameter (T+), wherein this addition is made so that over one second on average the first timer-parameter is added "a" times and the second timer-parameter is added "b" times, thereby ensuring that a value of the local timer essentially overlaps the period frequency of the periodic signal; and in response to receiving a subsequent periodic signal, setting the value of the local timer to a propagation delay of the periodic signal, for maintaining the value of the local timer substantially synchronized with a master unit.

As would be appreciated by those skilled in the art, the method provided by the present disclosure is intended for use in any applicable form of digital integrated circuitry such as FPGA, ASIC and the like, but can also be implemented as a non-embedded software.

According to another embodiment, in response to receiving the subsequent periodic signal, the method further comprises performing a correction to at least one of the first arbitration parameter and the second arbitration parameter, wherein the correction is based upon the value of the local timer at the arrival of the periodic signal and the known period of the signal.

By yet another embodiment, the first timer-parameter T− is added "a" times for every "b" times that the second timer-parameter T+ is added, the arbitration ratio being defined by $$\frac{b}{a+b}.$$

In accordance with another embodiment, the method further comprises adding to the local timer either the first timer-parameter or the second timer-parameter for every clock cycle.

According to another embodiment, upon receiving of a subsequent periodic signal, the method further comprises determining if the value local timer is lower than the period frequency, and if in the affirmative, adding higher number of second timer-parameters for future clock cycles.

In accordance with another embodiment, upon receiving a subsequent periodic signal, the method further comprises determining if the value local timer is higher than the period frequency, and if in the affirmative, adding higher number of first timer-parameters for future clock cycles.

By yet another embodiment, the periodic signal is received from a master unit.

According to another aspect of the disclosure there is provided a network element maintaining a synchronized local timer using a periodic signal having a known period frequency, the network element comprising:
  a receiver configured to receive periodic signals;
  at least one processor associated with a value of a clock cycle, configured to:
    determine, based on the clock cycle, values for a first timer-parameter ("T−") and a second timer-parameter ("T+"), wherein the value of the first timer-parameter T− is lower than the value of the clock cycle and the value of the second timer-parameter T+ is higher than the value of the clock cycle;
    determine, based on the clock cycle, values for a first arbitration parameter ("a") associated with the first timer-parameter and a second arbitration parameter ("b") associated with the second timer-parameter;
    in response to receiving a first periodic signal, add every clock cycle to the local timer, at least once the first timer-parameter (T−) and/or at least once the second timer-parameter (T+), wherein this addition is made so that over one second on average the first timer-parameter is added "a" times and the second timer-parameter is added "b" times, thereby ensuring that a value of the local timer essentially overlaps the period frequency of the periodic signal; and
    set the value to the local timer, in response to receiving a subsequent periodic signal, to a propagation delay of the periodic signal, for maintaining the value of the local timer substantially synchronized with a master unit.

In accordance with another embodiment, upon receipt of the subsequent periodic signal, the at least one processor is further configured to perform a correction to at least one of the first arbitration parameter and the second arbitration parameter, and wherein the correction is based upon the value of the local timer at the arrival of the periodic signal and the known period of the signal.

According to another embodiment, upon receipt of the subsequent periodic signal, the at least one processor (which could be for example a logical circuit implemented within the block) is further configured to determine if the value local timer is lower than the period frequency, and if in the affirmative, to add a higher number of second timer-parameters for future clock cycles to the local timer.

By yet another embodiment, upon receipt of the subsequent periodic signal, the at least one processor is further configured to determine if the value local timer is higher than the period frequency, and if in the affirmative, to add a higher number of first timer-parameters for future clock cycles to the local timer.

According to another aspect, there is provided a module connectable to a network element associated with a clock cycle and receiving periodic signals having a known period frequency, wherein the module configured to maintain a synchronized local timer at the network element, the module comprising:
  at least one processor associated with a value of a clock cycle, configured to:
    receive values for a first timer-parameter ("T−") and a second timer-parameter ("T+"), wherein the value of the first timer-parameter T− is lower than the value of the clock cycle and the value of the second timer-parameter T+ is higher than the value of the clock cycle;
    receive values for a first arbitration parameter ("a") associated with the first timer-parameter and a second arbitration parameter ("b") associated with the second timer-parameter;
    in response to receiving a first periodic signal, add every clock cycle to a local timer, at least once the first timer-parameter (T−) and/or at least once the second timer-parameter (T+), wherein this addition is made so that over one second on average the first timer-parameter is added "a" times and the second timer-parameter is added "b" times, thereby ensuring that a value of the local timer essentially overlaps the period frequency of the periodic signal; and
    set the value to the local timer, in response to receipt of a subsequent periodic signal, to a propagation delay of the periodic signal, for maintaining the value of the local timer substantially synchronized with a master unit.

According to another embodiment, upon receipt of the subsequent periodic signal by the module, the at least one processor is further configured to determine if the value local timer is lower than the period frequency, and if in the affirmative, to add to the local timer a higher number of second timer-parameters for future clock cycles.

By still another embodiment, upon receipt of the subsequent periodic signal by the module, the at least one processor is further configured to determine if the value local timer is higher than the period frequency, and if in the affirmative, to add and if in the affirmative, to add to the local timer a higher number of first timer-parameters for future clock cycles.

BRIEF DESCRIPTION OF THE DRAWINGS

The accompanying drawings, which are incorporated in and constitute a part of this specification, illustrate several embodiments of the disclosure and, together with the description, serve to explain the principles of the embodiments disclosed herein.

FIG. 3 is a flow chart detailing the workings of TLC.

DESCRIPTION OF EXEMPLARY EMBODIMENTS

Some of the specifics details and values in the following detailed description refer to a main example of a 156.25 MHz Lclock whose period is T=6.4 ns. However, the 156.25 MHz clock is provided only by way of example and is not intended to limit the scope of the invention in any way. As will be appreciated by those skilled in the art, the claimed method and apparatus may be implemented on any local clock frequency, and any periodic signal. In addition, the described embodiments comprise different steps and calculations, not all of which are required in all embodiments of the invention. The scope of the invention can be summarized by referring to the appended claims.

Figure 1:
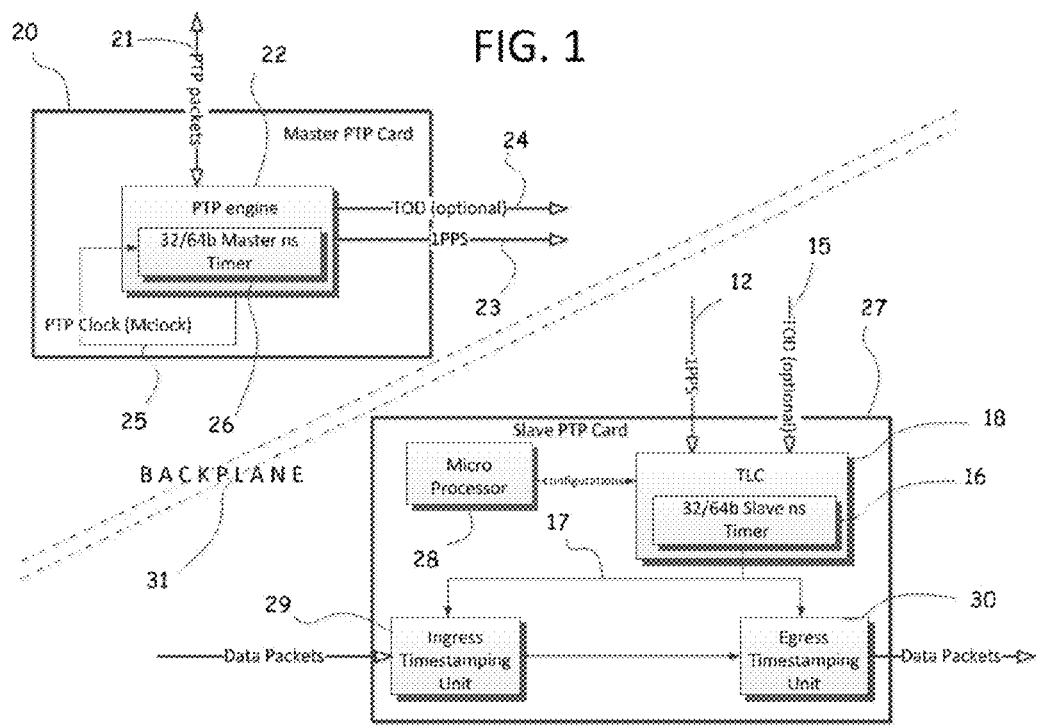
FIG. 1 is a schematic representation of the apparatus in a distributed system according to some embodiments.

An exemplary distributed system in which the apparatus may operate is illustrated in FIG. 1.

As was described in the background section, distributed systems which are compliant with IEEE 1588 may have a master PTP card (20) where all PTP packets are routed to and delivered from (21). This card may hold a dedicated piece of PTP HW called the PTP engine (22) which can receive the PTP packets and implements the 1588 clock recovery algorithm. The PTP engine (22) may maintain a 64 b MTimer (26), and can output the recovered Mclock (25), a 1PPS signal (23), and an optional TOD signal (24).

Packet forwarding card (27) may be part of any network element in the distributed system. The apparatus' (18) free parameters may be configured by using an associated (e.g., onboard) processor (28) or the apparatus may acquire these values by carrying out any other method which enables its operation. The apparatus is configured to receive a periodic signal, e.g., the 1PPS (12) and optional TOD (15) from the master card (20) through the backplane (31) or any other mode of signal delivery within a distributed system. The apparatus may maintain its LTimer (16) synchronized to the MTimer (26) and outputs a LTimer signal (17). LTimer signal may be used by an Ingress Timestamping Unit (29) to stamp incoming packets with the current time and/or by an Egress Timestamping Unit (30) to calculate the residence time of the packet according to the ingress time-stamp and the current value of LTimer (16).

Figure 2:
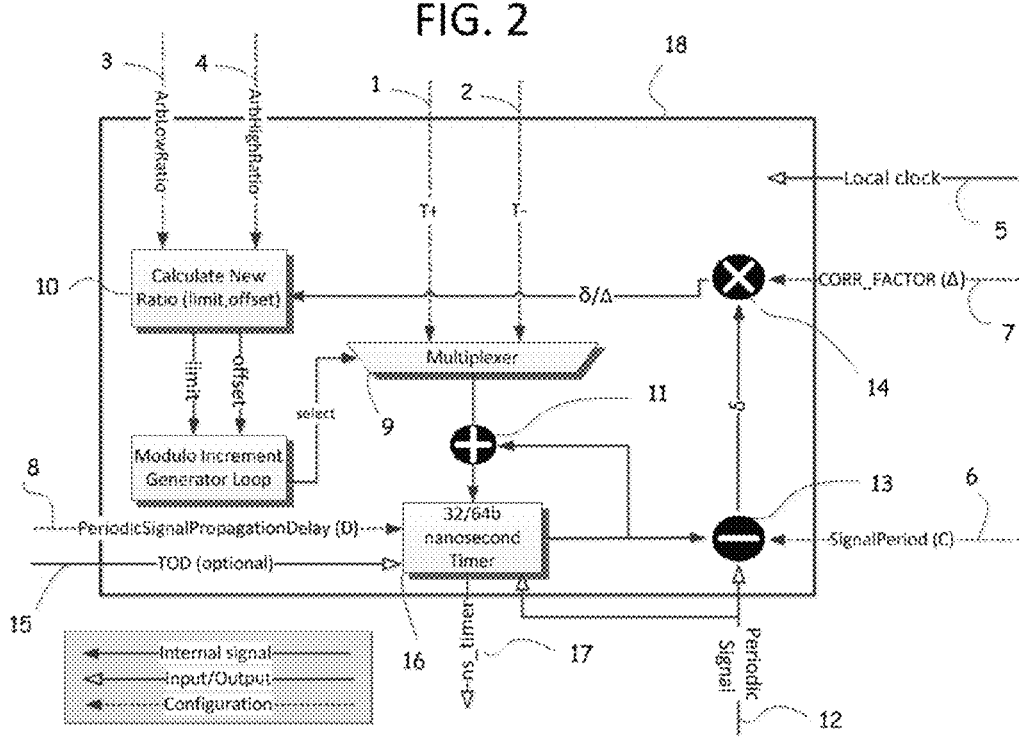
FIG. 2 is a schematic representation of the apparatus according to some embodiments.

An exemplary apparatus is described in further details in FIG. 2. Components corresponding to those shown in FIG. 1 are designated by the same reference numbers. The algorithm carried out by the apparatus may include the following free parameters dictating the operation of the apparatus. Each parameter is written in its full name followed by a short name in parentheses (to ease its marking in the following computations and equations).

The parameters T+ (1) and T− (2) represent possible increments of the LTimer (16). The parameters ArbLowRatio "b" (3) and ArbHighRatio "a" (4) represent an arbitration scheme, by which either T+ or T− is added to LTimer (16) on every Lclock cycle (5). The parameters SignalPeriod "C" (6) and CorrectionFactor "Δ" (7), enable the apparatus to re-compute arbitration parameters according to the value of LTimer (16) on the arrival of the periodic signal "S" (12). The term "periodic signal" as used herein refers to any electrical signal having a known period, e.g., one-pulse-per-second (1PPS) signal.

PeriodicSignalPropagationDelay "D" (8) is another parameter allowing apparatus (18) to compensate for the propagation delay of the periodic signal S through the system from the network element that comprises the MTimer (26) to the network element that comprises that apparatus. In some embodiments, the apparatus may maintain a 32 b timer with the optional TOD input (15), enabling the apparatus to maintain a 64 b timer. The apparatus may output a 32 b or a 64 b signal (17).

According to an embodiment, on each Lclock cycle (5), either T+ or T− may be added to a multiplexer (9) depending on a ratio calculation (10) which controls the arbitration. Upon receipt of "S" (12), the apparatus may calculate a correction value δ (13) and then multiply it by Δ (7) to obtain the feedback needed for the arbitration cycle. This feedback is fed into the ratio calculation (10), which may modify the ratio of T+ to T− to match the LTimer with the MTimer on the next expected receipt of the periodic signal. Upon receipt of "S" (12), the LTimer may be reset with the value of D (8), which predicts the value of the MTimer at the arrival time of the periodic signal.

The following disclosure provides an example of how to obtain the values of the working parameters presented in FIG. 2 from the Lclock period T. However, as will be appreciated by those skilled in the art, in some embodiments the parameters' values required for the apparatus operation, may be provided rather than determined by apparatus' processor.

The parameter TPLUS (T+)−(1) is an integer having a value such that $T^+=\lfloor T \rfloor+1$, where T is given in ns and $\lfloor X \rfloor$ is the floor function.

The parameter TMINUS (T−)−(2) is an integer value such that $T^-=\lceil T \rceil-1$, where T is given in ns and $\lceil X \rceil$ is the ceiling function.

The parameter ArbitrationHighRatio (4) is an integer that is denoted herein by the letter "a".

The parameter ArbitrationLowRatio (3) is an integer that is denoted herein by the letter "b".

The parameter D (8) is a physical derivative of the system in which the apparatus is implemented, which may be physically measured.

The parameter CorrectionFactorΔ (7) is a positive rational number having a value that is smaller than one.

A straight forward approach to keep the LTimer counting correctly would be to add T ns to the LTimer each Lclock cycle. However, if T is not an integer (as is often the case), this may require the use of dedicated adder blocks which have multiple cycle latencies. To circumvent this problem, the apparatus described herein can arbitrate between T+ and T−, by adding one of them to the LTimer each Lclock cycle, such that the average addition per Lclock cycle would match the Lclock period T. Therefore, the apparatus adds a times T⁻ for every b T⁺ so that the following relationship is maintained:

$$\frac{1}{T}\left(\frac{T^- \cdot a + T^+ \cdot b}{a+b}\right) = 1$$

For example, Lclock=156.25 MHz, T=6.4 ns results in T⁺=7, T⁻=6 and a=3, b=2, such that:

$$\frac{1}{6.4}\left(\frac{6 \times 3 + 7 \times 2}{3+2}\right) = \frac{1}{6.4}\left(\frac{32}{5}\right) = 1$$

The following example describes two scenarios to determine values for a, b that depend on whether T is an integer or not. However, other values of a, b, may obviously be used.

In case T is not an integer (i.e., $T \in \mathbb{Q} \setminus \mathbb{N}$), T can be represented as:

$$T = A + \frac{Nom}{Den} = \frac{A \cdot Den + Nom}{Den}$$

Where A, Nom, Den$\in \mathbb{N}$ and Nom<Den. In our example $$6.4 = 6 + \frac{2}{5} = \frac{6 \cdot 5 + 2}{5}$$

In this case:

$T^+ = \lfloor T \rfloor + 1 = A+1$ $T^- = \lceil T \rceil - 1 = A$

By requiring:

$a+b=Den$

And $A \cdot a + (A+1) \cdot b = A \cdot Den + Nom$

The values for a, b may be:

$b=Nom, a=Den-Nom$

In case T is an integer (i.e., $T \in \mathbb{N}$), T⁺ and T⁻ are simply:

$T^+ = \lfloor T \rfloor + 1 = A+1$ $T^- = \lceil T \rceil - 1 = A-1$

And the solution:

$b=a=1$

In some embodiment the Mclock and Lclock are not necessarily derivatives of the same clock source, therefore inherent frequency differences may be expected. Let the frequency of Lclock be equal to X MHz and the frequency of Mclock be equal to Y MHz, i.e. one second under Lclock (X ticks) will be different than one second under Mclock (Y ticks). This means that a timer which counts under Lclock 1/T times a second and each time (on average) adds T, at the end of C ns under Mclock, when the periodic signal is received, may be above or below C. In other words, one may regard the above as having two counters running under two different clocks, both counting one second. When one timer reaches one second, the other timer is either not there yet or has already passed the one second.

For example, if the periodic signal is 1PPS, at its arrival, the LTimer may be above or below C=10⁹ ns=1 sec although we have (on average) added T ns to timer each Lclock cycle.

To compensate for this error and to correctly match the MTimer running under Mclock over long periods of time, the apparatus can change the b parameter as a function of time. For example, adding to it if LTimer is too slow or subtracting from it if LTimer is too fast, thereby adding more (or less) T⁺ to the LTimer.

If the LTimer has not yet been wrapped around, in order to establish the addition or subtraction required, the apparatus may calculate:

$\delta = (D+C-\text{Timer})$

In other words, one addition or subtraction is made to b. It then may implicitly determine a number for T− and T+.

If the LTimer has wrapped around, the apparatus may calculate:

$\delta = (D-\text{Timer})$

The CorrectionFactor Δ and correction value δ may then be used to correct the value of b.

$b(t+1) = b(t) + \delta \cdot \Delta$ where b(t) is the value b holds at iteration t, each iteration marking the arrival of S. The CorrectionFactor may be derived from:

$$\Delta = \frac{(a+b)^2 + (a+b)}{a \cdot T}$$

Where a, b are at their initial values as described above. This stems from the approximation of adding one unit to b such that:

$$\frac{b+1}{a+b+1} - \frac{b}{a+b} = \frac{a}{(a+b)^2 + (a+b)}$$

At the arrival of the periodic signal, apart from correcting the arbitration ratio b, the LTimer is set to D in order to compensate for propagation delay. For example, if the propagation delay between the master card and the apparatus is measured to be 4 ns, this corresponds to D=4 and at the arrival of the periodic signal, the LTimer is set to 4, as this is the current value of the MTimer running at the master card to which the apparatus is synchronized.

FIG. 3 is a flow chart that illustrates an exemplary operation of an apparatus according to the present disclosure.

Step 300 includes providing values for the cycle C and the delay D pertaining to the periodic signal S. For the case of a 1588 system, where S would be the 1PPS signal, C=10⁹ ns, and D is dependent on the system configuration. Step 310 includes providing values for the parameters T+, T−, a, b, and Δ. Steps 320 to 380 may take place every Lclock cycle. In step 320 either T+ or T− may be added to the LTimer as derived from the values of a and b. If the LTimer reaches the value C, step 330, then the LTimer is reset to zero and a variable "Looped" is assigned the value TRUE. Otherwise, step 340 includes checking if the expected periodic signal S is received. If in the affirmative, the arbitration parameter b is modified according to the values of the LTimer, C, D and A. If the LTimer has not yet been wrapped around, i.e., Looped is FALSE, then in step 360 Parameter b is reset to b<=b+(D+C−LTimer)×Δ. But if the LTimer has been wrapped around, i.e., Looped is TRUE, then in step 370 Parameter b is reset to b<=b+(D−LTimer)×Δ. Then in step 380 the LTimer is reset to the value of D which is the expected value of the MTimer at the moment of the arrival of S. Parameter b is modified so that the LTimer will match the MTimer on the next expected arrival of S.

As aforementioned the Lclock and the Mclock may have different frequencies. The apparatus can change the value of b(t) such that the arbitration ratio lies within the range of $$\frac{1}{a} \le \frac{b}{a+b} \le 1,$$

thus enabling addition of just $T^+$ or just $T^-$ to the LTimer each Lclock cycle, thereby enabling the LTimer to deviate by many thousands of ppm up or down from the given Lclock frequency, much more that the common value of 200 ppm which is dictated in telecommunication standards for clocks.

If T is very close up to one part in one-thousand from being an integer, i.e.

$$\frac{T - \lfloor T \rfloor}{T} < 1 \times 10^{-3} \text{ or } \frac{\lceil T \rceil - T}{T} < 1 \times 10^{-3}$$

then round(T) should substitute T in the calculations of T+, T−, a and b described above, where round( ) is the rounding to nearest integer function. This way, frequency deviations of 1000 ppm can always be accounted for between Lclock and Mclock. It should be understood to any person skilled in the art that the above example, where T is very close up to one part in one-thousand from being an integer, is used herein merely for demonstration purposes of a case where one may always withstand 1000 ppm differences. In the alternative, it can be changed to withstand 10,000 ppm differences by changing for example the value of $10^{-3}$ in the above relationship to $10^{-2}$.

In some embodiments at least one parameter is determined to enable the apparatus to provide accurate timing that conforms to various protocols. For example, in order to conform with the IEEE 1588 residence time stamping deviations, the apparatus needs to be within 50 ns of the timer in the master card. Since the apparatus precision is limited by the values of a and b, the larger the values, the better the precision. It should be noted that one may keep $$a + b < \left(\frac{C}{10^9}\right) \cdot \text{Lclock\_frequency[MHz]}$$

or the arbitrator will not perform a full cycle adding a times T− and b times T+ and the ratio set will not be correct. In the example above, $(2+3) \cdot 10^7 < 156.25 \cdot 10^6$.

An increase or decrease of one unit from b turns into a fractional deviation of:

$$\frac{b+1}{a+b+1} - \frac{b}{a+b} = \frac{a}{(a+b)^2 + (a+b)} \approx \frac{a}{(a+b)^2}$$

for every second.

Assuming a≈b, the precision limit is:

$$\frac{a}{(a+b)^2} \approx \frac{1}{4a}$$

This would limit the apparatus to run on Lclock above 5 MHz for the required 50 ns precision in the case where $C=10^9$ ns.

In the main example, the following values may be used:

$$a = 3 \cdot 10^7, \ b = 2 \cdot 10^7$$

An increase or decrease of one unit from b with these values turns into a fractional deviation of:

$$\frac{a}{(a+b)^2} = 1.2 \cdot 10^{-8} = 12 \text{ ns}$$

for every second.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for maintaining a synchronized local timer in a network element by using a periodic signal having a known period frequency, the method comprising:
   providing a value of a clock cycle associated with the network element, and values for a first timer-parameter ("T−") and a second timer-parameter ("T+"), wherein the value of the first timer-parameter T− is lower than the value of the clock cycle and the value of the second timer-parameter T+ is higher than the value of the clock cycle;
   providing values for a first arbitration parameter ("a") associated with the first timer-parameter and a second arbitration parameter ("b") associated with the second timer-parameter;
   in response to receiving a periodic signal, adding every clock cycle to the local timer of the network element, at least once the first timer-parameter (T−) and/or at least once the second timer-parameter (T+), wherein said addition is made so that on average over one second, the first timer-parameter is added "a" times and the second timer-parameter is added "b" times, thereby ensuring that a value of the local timer essentially overlaps the period frequency of the periodic signal; and
   in response to receiving a subsequent periodic signal, setting the value of the local timer to a propagation delay of the periodic signal, for maintaining the value of the local timer substantially synchronized with a master unit.

2. The method of claim 1, wherein in response to receiving the subsequent periodic signal, performing a correction to at least one of the first arbitration parameter and the second arbitration parameter, wherein the correction is based on the value of the local timer at the arrival of the periodic signal and the known period of the signal.

3. The method of claim 1, wherein the first timer-parameter T− is added a times for every b times that the second timer-parameter T+ is added, the arbitration ratio being defined by $$\frac{b}{a+b}.$$

4. The method of claim 1, for every clock cycle either the first timer-parameter or the second timer-parameter is added to the local timer.

5. The method of claim 4, adding to the local timer every clock cycle either the first timer-parameter or the second timer-parameter.

6. The method of claim 1, wherein upon receiving of a subsequent periodic signal, determining if the value local timer is lower than the period frequency, in if the affirmative, adding to the local timer a higher number of second timer-parameters for future clock cycles.

7. The method of claim 1, wherein upon receiving of a subsequent periodic signal, determining if the value local timer is higher than the period frequency, in the affirmative, adding to the local timer a higher number of first timer-parameters for future clock cycles.

8. The method of claim 1, wherein the periodic signal is received from the master unit.

9. The method of claim 1, wherein the periodic signal is a 1-pulse-per-second signal (1PPS).

10. A network element maintaining a synchronized local timer using a periodic signal having a known period frequency, the network element comprising:
a receiver configured to receive periodic signals;
at least one processor associated with a value of a clock cycle, configured to:
determine, based on the clock cycle, values for a first timer-parameter ("T−") and a second timer-parameter ("T+"), wherein the value of the first timer-parameter T− is lower than the value of the clock cycle and the value of the second timer-parameter T+ is higher than the value of the clock cycle;
determine, based on the clock cycle, values for a first arbitration parameter ("a") associated with the first timer-parameter and a second arbitration parameter ("b") associated with the second timer-parameter;
in response to receiving a first periodic signal, add to the local timer every clock cycle at least once the first timer-parameter (T−) and/or at least once the second timer-parameter (T+), wherein said addition is made so that on average over one second, the first timer-parameter is added "a" times and the second timer-parameter is added "b" times, thereby ensuring that a value of the local timer essentially overlaps the period frequency of the periodic signal; and
set the value to the local timer, in response to receipt of a subsequent periodic signal, to a propagation delay of the periodic signal, for maintaining the value of the local timer substantially synchronized with a master unit.

11. The network element of claim 10, wherein upon receipt of the subsequent periodic signal, the at least one processor is further configured to perform a correction to at least one of the first arbitration parameter and the second arbitration parameter, wherein the correction is based on the value of the local timer at the arrival of the periodic signal and the known period of the signal.

12. The network element of claim 10, wherein upon receipt of the subsequent periodic signal, the at least one processor is further configured to determine if the value local timer is lower than the period frequency, and if in the affirmative, to add to the local timer a higher number of second timer-parameters for future clock cycles.

13. The network element of claim 10, wherein upon receipt of the subsequent periodic signal, the at least one processor is further configured to determine if the value local timer is higher than the period frequency, and if in the affirmative, to add to the local timer to the local timer a higher number of first timer-parameters for future clock cycles.

14. The network element of claim 10, wherein the periodic signal is received from the master unit.

15. The network element of claim 10, wherein the periodic signal is a 1-pulse-per-second signal (1PPS).

16. A module connectable to a network element associated with a clock cycle and receiving periodic signals having a known period frequency, the module configured to maintain a synchronized local timer at the network element, the module comprising:
at least one processor associated with a value of a clock cycle, configured to:
receive values for a first timer-parameter ("T−") and a second timer-parameter ("T+"), wherein the value of the first timer-parameter T− is lower than the value of the clock cycle and the value of the second timer-parameter T+ is higher than the value of the clock cycle;
receive values for a first arbitration parameter ("a") associated with the first timer-parameter and a second arbitration parameter ("b") associated with the second timer-parameter;
in response to receiving a first periodic signal, add to the local timer every clock cycle at least once the first timer-parameter (T−) and/or at least once the second timer-parameter (T+), wherein said addition is made so that on average over one second, the first timer-parameter is added "a" times and the second timer-parameter is added "b" times, thereby ensuring that a value of the local timer essentially overlaps the period frequency of the periodic signal; and
set the value to the local timer, in response to receipt of a subsequent periodic signal, to a propagation delay of the periodic signal, for maintaining the value of the local timer substantially synchronized with a master unit.

17. The module of claim 16, wherein upon receipt of the subsequent periodic signal, the at least one processor is further configured to determine if the value local timer is lower than the period frequency, and if in the affirmative, to add to the local timer a higher number of second timer-parameters for future clock cycles.

18. The module of claim 16, wherein upon receipt of the subsequent periodic signal, the at least one processor is further configured to determine if the value local timer is higher than the period frequency, and if in the affirmative, to add to the local timer a higher number of first timer-parameters for future clock cycles.

* * * * *